(12) United States Patent
Mildner et al.

(10) Patent No.: US 8,973,980 B2
(45) Date of Patent: Mar. 10, 2015

(54) LOAD-BEARING STRUCTURAL COMPONENT FOR THE BODY OF A MOTOR VEHICLE

(71) Applicant: GM Global Technology Operations LLC, Detroit, MI (US)

(72) Inventors: Udo Mildner, Limburg (DE); Lothar Teske, Aschaffenburg (DE)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/685,547

(22) Filed: Nov. 26, 2012

(65) Prior Publication Data

US 2013/0134742 A1    May 30, 2013

(30) Foreign Application Priority Data

Nov. 26, 2011   (DE) .......................... 10 2011 119 561

(51) Int. Cl.
| | | |
|---|---|---|
| B62D 25/08 | (2006.01) | |
| B62D 25/14 | (2006.01) | |
| B62D 29/00 | (2006.01) | |
| B62D 29/04 | (2006.01) | |

(52) U.S. Cl.
CPC .............. *B62D 25/088* (2013.01); *B62D 25/14* (2013.01); *B62D 29/007* (2013.01); *B62D 29/041* (2013.01)
USPC .. 296/193.09; 296/192; 296/198; 296/203.02

(58) Field of Classification Search
USPC .................. 296/193.09, 187.09, 193.05, 198, 296/203.01, 203.02, 203.03, 204, 192; 280/781, 787, 124.147
See application file for complete search history.

(56) References Cited

U.S. PATENT DOCUMENTS

| | | | | | |
|---|---|---|---|---|---|
| 4,717,198 | A | * | 1/1988 | Komatsu ....................... | 296/192 |
| 4,950,024 | A | * | 8/1990 | Watari et al. .................. | 296/192 |
| 5,052,742 | A | * | 10/1991 | Akoshima et al. ............ | 296/192 |
| 5,344,187 | A | * | 9/1994 | Kreis et al. .................... | 280/788 |
| 5,346,276 | A | * | 9/1994 | Enning et al. ............ | 296/203.02 |
| 5,456,517 | A | * | 10/1995 | Kalian et al. ............. | 296/193.01 |
| 6,193,273 | B1 | | 2/2001 | Novak et al. | |
| 6,209,950 | B1 | * | 4/2001 | Hanyu ..................... | 296/203.02 |
| 6,332,642 | B1 | * | 12/2001 | Hanyu ..................... | 296/203.02 |
| 7,147,275 | B2 | * | 12/2006 | Matsuyama et al. ..... | 296/203.02 |
| 7,374,219 | B2 | * | 5/2008 | Brennecke ................... | 296/204 |
| 7,594,692 | B2 | * | 9/2009 | Shishido .................. | 296/203.02 |
| 7,770,964 | B2 | * | 8/2010 | Herntier et al. .......... | 296/193.01 |
| 7,828,330 | B2 | * | 11/2010 | Tamura et al. ................ | 280/788 |

(Continued)

FOREIGN PATENT DOCUMENTS

| | | |
|---|---|---|
| DE | 19808392 A1 | 3/1999 |
| DE | 19931741 A1 | 1/2001 |

(Continued)

OTHER PUBLICATIONS

German Patent Office, Search Report for German Application No. 102011119561.4, dated Jul. 11, 2012.

*Primary Examiner* — Gregory Blankenship
(74) *Attorney, Agent, or Firm* — Ingrassia Fisher & Lorenz, P.C.

(57) ABSTRACT

A load-bearing structural component of a motor vehicle body is provided. The structural component is designed as a cast component, and exhibits at least one suspension strut holding fixture and a bulkhead section, which are joined together as a single piece. The cast component is designed as a cast steel component of a fabricated front structural node.

10 Claims, 2 Drawing Sheets

(56) References Cited

U.S. PATENT DOCUMENTS

| | | | |
|---|---|---|---|
| 7,854,474 B2 * | 12/2010 | Cox | 296/204 |
| 7,887,123 B2 * | 2/2011 | Honji et al. | 296/187.09 |
| 8,042,862 B2 * | 10/2011 | Cox | 296/204 |
| 8,128,160 B2 * | 3/2012 | Leanza et al. | 296/203.02 |
| 8,177,293 B2 * | 5/2012 | Boettcher | 296/204 |
| 8,414,057 B2 * | 4/2013 | Yamagishi | 296/70 |
| 8,448,966 B2 * | 5/2013 | Rawlinson et al. | 280/124.155 |
| 8,651,563 B2 * | 2/2014 | Mildner et al. | 296/203.02 |
| 2001/0033094 A1 * | 10/2001 | Sano et al. | 296/194 |
| 2005/0046237 A1 * | 3/2005 | Miyoshi et al. | 296/203.02 |
| 2006/0006699 A1 * | 1/2006 | Matsuyama et al. | 296/203.02 |
| 2008/0122146 A1 | 5/2008 | Herntier et al. | |
| 2008/0185875 A1 * | 8/2008 | Joest et al. | 296/203.02 |
| 2009/0302642 A1 * | 12/2009 | Guyomard et al. | 296/193.09 |
| 2010/0096888 A1 * | 4/2010 | Cox | 296/204 |
| 2011/0101641 A1 | 5/2011 | Mildner et al. | |
| 2012/0248823 A1 * | 10/2012 | Mildner et al. | 296/203.02 |
| 2012/0261952 A1 * | 10/2012 | Mildner et al. | 296/203.02 |
| 2013/0049407 A1 * | 2/2013 | Kageyama | 296/204 |
| 2013/0134742 A1 * | 5/2013 | Mildner et al. | 296/203.02 |
| 2013/0229031 A1 * | 9/2013 | Bisror et al. | 296/201 |

FOREIGN PATENT DOCUMENTS

| | | |
|---|---|---|
| DE | 60015683 T2 | 12/2005 |
| DE | 102005043948 A1 | 4/2007 |
| DE | 102006014552 A1 | 9/2007 |
| DE | 102006055730 A1 | 5/2008 |
| DE | 102008050297 A1 | 5/2009 |
| DE | 102009042060 A1 | 3/2011 |

* cited by examiner

LOAD-BEARING STRUCTURAL COMPONENT FOR THE BODY OF A MOTOR VEHICLE

CROSS-REFERENCE TO RELATED APPLICATION

This application claims priority to German Patent Application No. 10 2011 119 561.4, filed Nov. 26, 2011, which is incorporated herein by reference in its entirety.

TECHNICAL FIELD

The present disclosure relates to a load-bearing structural component, in particular a front suspension strut holding fixture of a motor vehicle body designed as a cast part.

BACKGROUND

Motor vehicle bodies and their load-bearing structural components are to impart a required stability and stiffness to the motor vehicle at the lowest possible weight, for example so as to be able to provide optimal protection to passengers and pedestrians. In addition, motor vehicle bodies are to be protected against premature corrosion and ageing processes, and thus exhibit a long service life.

For example, a motor vehicle load-bearing structure with a cast light metal node is known from DE 198 08 392 A1, e.g., on which hold points for a front axle are integrated. Also screwed on in the region of such axle-side hold points is a cross member as a subframe, which can additionally stiffen the body. Connected in addition to the cross member in a final assembly configuration are a windshield panel cross member in the region of an A-column connection part along with a tunnel cross member on a connection part in the region of the hold points of the front end base node element.

Even though giving a front end base node element a cast light metal design can help reduce the overall weight of the vehicle, the connecting sections to adjoining body components, e.g., fabricated out of sheet steel, must be provided with insulation to avoid any potential contact corrosion between the cast light metal component and the adjoining body components made out of sheet steel.

A suitable insulation material must here be applied as precisely as possible over the entire extension of provided connecting flanges, and separately inspected before the body components are joined together. In this regard, assembling a front end base node element comprised of a cast light metal component involves a comparatively high outlay. In addition, premature corrosion can arise in the region connecting to the cast light metal component, in one example, given an incomplete or faulty insulation, which can markedly shorten the service life of the body.

Apart from that, the end sections of a motor vehicle bulkhead lying in the transverse direction of the vehicle (y) can in some cases be rather difficult to access, depending on the vehicle geometry, but in particular given windshields of motor vehicles that extend far toward the front. However, since the bulkhead hermetically separates the vehicle interior from the vehicle exterior, the body components provided in this region must be connected with each other so as to form a seal.

Therefore, it may be desirable to provide an improved load-bearing structural component for a motor vehicle body, in particular a structural node component, which enables a simple and efficient assembly, and which is optimized in particular with regard to any seals to be provided in the vehicle bulkhead region. In addition, the load-bearing structural component is to be inexpensive to manufacture, exhibit a long service life, and have a comparatively low weight, in particular to reduce the overall weight of the motor vehicle.

In addition, other objects, desirable features and characteristics will become apparent from the subsequent summary and detailed description, and the appended claims, taken in conjunction with the accompanying drawings and this background.

SUMMARY

According to various exemplary embodiments, a load-bearing structural component is provided in this respect that is especially designed as a front structural node of a motor vehicle body, which at roughly the height of the motor vehicle bulkhead is to be structurally joined with a longitudinal member running substantially in the longitudinal direction of the vehicle. The load-bearing structural component is here designed as a cast component, in one example, a cast metal component, and exhibits a suspension strut holding fixture as well as a bulkhead section, which are joined together as a single piece or designed as a single piece. In other words, the load-bearing structural component fabricated as a cast part exhibits a bulkhead section and a suspension strut holding fixture, which are both configured as an integral constituent of the cast metal component.

The load-bearing structural component exhibiting a suspension strut holding fixture generally provides an end section of the motor vehicle bulkhead lying on the outside relative to the transverse direction of the vehicle (y), so that a connection, and hence a seam joining the load-bearing structural component with the body-side bulkhead, can be shifted further toward the middle of the vehicle viewed in the transverse direction of the vehicle (y), where it is rather easy to access during vehicle assembly. In this regard, this simplifies and ultimately improves the process of joining and fastening the load-bearing structural component, in one example, with respect sealing it (relative) to the vehicle bulkhead.

In another exemplary embodiment, the load-bearing structural component further exhibits a windshield support, which is joined as a single piece with the suspension strut holding fixture and/or as a single piece with the bulkhead section.

Similarly, another exemplary embodiment can further provide a wheel suspension strut, which is joined as a single piece with the suspension strut holding fixture and bulkhead section, and/or which is joined as a single piece with the windshield support or has a corresponding single-piece design. In other words, the load-bearing structural component designed as a cast metal component exhibits several sections, at least one suspension strut holding fixture along with one bulkhead section, and in exemplary embodiments, a windshield support section in conjunction with a wheel suspension strut section.

Integrating the suspension strut holding fixture, bulkhead section, windshield support and/or wheel suspension strut into only a single cast component makes it possible to simplify and improve the assembly process for the suspension strut holding fixture, but in particular the process of sealing and connection with adjoining body components, for example the windshield support, the wheel suspension strut along with the bulkhead of the motor vehicle.

Another exemplary embodiment here provides in one example, that the suspension strut holding fixture, bulkhead section, windshield support and wheel suspension strut comprise a self-contained, roughly box-like structure, wherein the individual sections or components of the load-bearing structural component are fixedly joined together on the one hand and sealed away from each other on the other due to the integral configuration in a cast metal component.

In another exemplary embodiment, the load-bearing structural component is designed as a cast steel component, for example which can be fabricated in a lost-foam casting process. In one example, the cast steel component is here designed as a thin-walled cast steel component with wall thicknesses ranging from about 1.5 to about 1.8 mm. Depending on the load exposure, the wall thickness of the cast steel part can regionally or partially also measure about 2 to about 2.5 mm. Fabricating a cast steel component can prevent the occurrence of any contact corrosion with adjoining components of the motor vehicle body from the very outset. This advantageously eliminates the need for any insulation measures. In addition, the comparatively thin-walled design of the cast steel component can easily satisfy the required stability criteria.

The load-bearing structural component fabricated via steel casting can be provided with a geometric design corresponding to its load requirement profile during manufacture, for example based on the lost-foam casting process. Complicated and back-cut geometries can also be fabricated largely without any problem. In addition, individual reinforcing elements, like reinforcing ribs, can be integrated directly into the load-bearing structural component, in one example, on sections exposed to especially high stresses or loads.

In another exemplary embodiment, it is also conceivable to design the load-bearing structural component as a cast plastic part, which at least regionally is provided with at least one structurally reinforcing inlay, in one example, with a metal inlay or similar reinforcing components. A plastic component can here be designed in one example, as an injection molded component.

In another exemplary embodiment, the load-bearing structural component further exhibits a wheel well section, which is joined as a single piece with the suspension strut holding fixture, the bulkhead section, the wheel suspension strut and/or windshield support, or designed as a single piece therewith. The wheel well section can exhibit a curved or arced shape corresponding to the wheel well, and exhibit one or more reinforcing structures, in one example, on its side facing away from the wheel, for example in the form of reinforcing ribs.

Another exemplary embodiment can also further provide that an end section of a drain channel be arranged between the bulkhead section, suspension strut holding fixture and wheel suspension strut, and designed as a single piece with the mentioned components, the bulkhead section, suspension strut holding fixture and/or wheel suspension strut. By connecting the drain channel, which is also to be referred to as a radiator tank, as a single piece with the bulkhead section and suspension strut holding fixture as well, and also as a single piece with the wheel suspension strut, the connecting region of a body-side drain channel on the load-bearing structural component can here also be shifted further toward the middle of the vehicle in relation to the transverse direction of the vehicle (y), so that the drain channel can from the very outset be joined with the wheel suspension strut adjoining it in the transverse direction of the vehicle (y) so as to form a seal.

The drain channel is generally provided with a drain, by way of which the water accumulating in the channel can be carried away toward the outside in the transverse direction of the vehicle (y), generally through an opening formed in the wheel suspension strut. The single-piece configuration of the drain channel and wheel suspension strut eliminates the need for separately joining and sealing these body components or sections.

In another exemplary embodiment, the windshield support transitions into the bulkhead section via a cover adjoining it. The adjoining sections comprised of the windshield support, cover and bulkhead wall section generally border an upper edge of the wheel suspension strut viewed in the transverse direction of the vehicle (y), and together with the wheel suspension strut form the already mentioned structure with a self-contained, roughly box-like design.

Let it here be noted that the drain channel can also contribute to the self-contained, box-like structure or shape of the load-bearing structural component.

Another exemplary embodiment here further provides that the windshield support, cover and/or bulkhead section extend substantially parallel to the surface normal of the laterally adjoining wheel suspension strut. In this regard, the windshield support, cover and bulkhead section extend substantially perpendicular to the alignment of the wheel suspension strut, and can together with the latter provide a box-like structure that is self-contained at least in three spatial directions and sealed.

Another exemplary embodiment further provides a motor vehicle body that exhibits at least one longitudinal member and a bulkhead, as well as at least one structural component described above. It is here provided in one example, that, when the structural component is in its final assembly position on the motor vehicle body, its bulkhead section forms a lateral elongation of the bulkhead of the motor vehicle body.

Similarly, another exemplary embodiment can also provide that the upper end of the body-side bulkhead be provided with a central windshield support protruding toward the front in the longitudinal direction of the vehicle, roughly in the traveling direction. With the load-bearing structural component described above in its final assembly position on the motor vehicle body, its windshield support can form a lateral elongation of this central, body-side windshield support.

Finally, another exemplary embodiment can also provide that the wheel suspension strut of the load-bearing structural component laterally border a drain channel situated upstream from the bulkhead in the traveling direction of the motor vehicle. In this regard, the drain channel provided on the load-bearing structural component can be designed as an edge-side elongation of a drain channel situated on the motor vehicle bulkhead, for example a radiator tank.

The fact that the load-bearing structural component combines several sections of adjoining body components, in one example, the bulkhead, the windshield support, a cover, a wheel suspension strut along with a drain channel, into a single cast component makes it easier to assemble the load-bearing structural component providing a structural node to the body. This is because attachment to the adjoining components of the motor vehicle body no longer takes place directly in the geometric node point, but somewhat removed from it, wherein the distance between the connecting seam and adjoining body components is determined by the extension of the respective body sections designed as a single piece with the load-bearing structural component, such as the bulkhead section, windshield support, wheel suspension strut or drain channel.

Finally provided according to another exemplary embodiment is a motor vehicle, which exhibits a motor vehicle body described above, or at least a load-bearing structural component described above.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
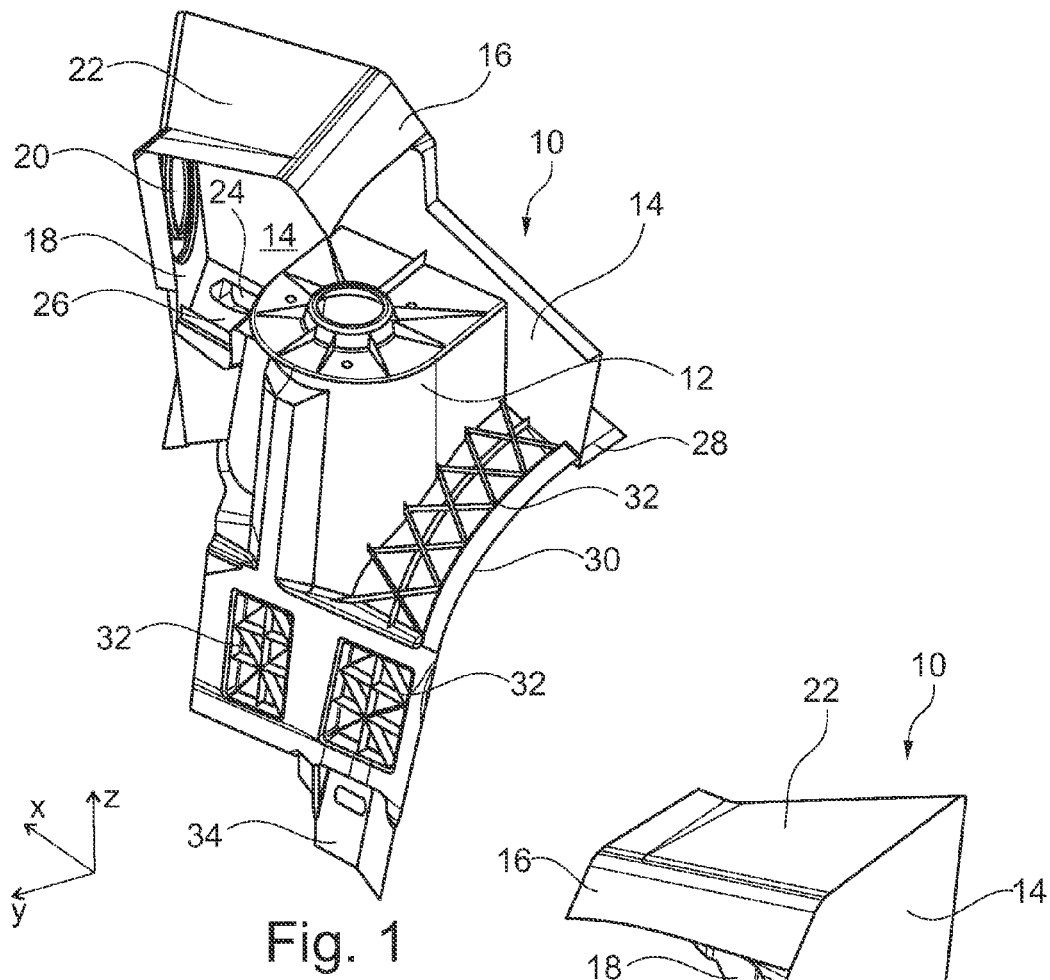
FIG. 1 is a perspective view of a load-bearing structural component designed as a structural node.
Figure 2:
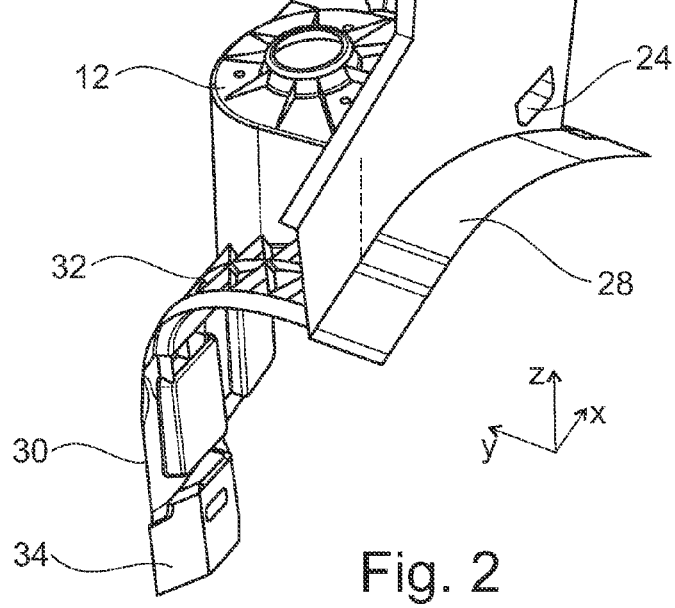
FIG. 2 is another perspective view of the load-bearing structural component.

The load-bearing structural component 10 shown in FIGS. 1 and 2 acts as a structural node, and is to be arranged in the region of the motor vehicle bulkhead 50 as well as a wheel well 46 of a motor vehicle. The load-bearing structural component 10 designed as a cast metal, in one example, cast steel component, exhibits a roughly pot-shaped suspension strut holding fixture 12 or a suspension strut dome, as well as an inner wheel suspension strut 14, which in the final assembly position on the motor vehicle extends roughly in the plane formed by the vertical vehicle axis (z) and longitudinal vehicle axis (x).

Figure 3:
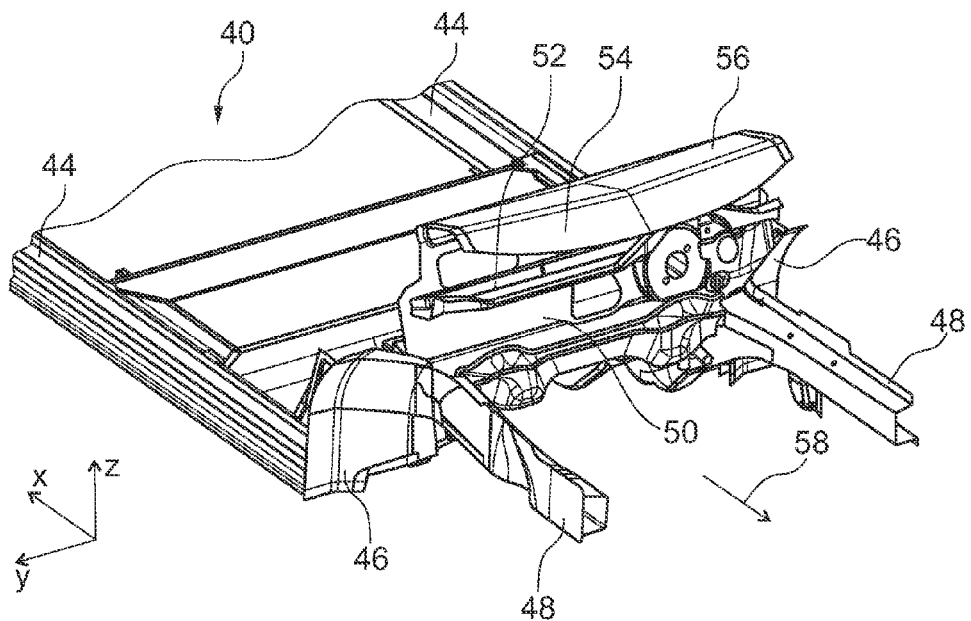
FIG. 3 is a motor vehicle body viewed at an inclination from the front, before securing the load-bearing structural component thereto.
Figure 4:
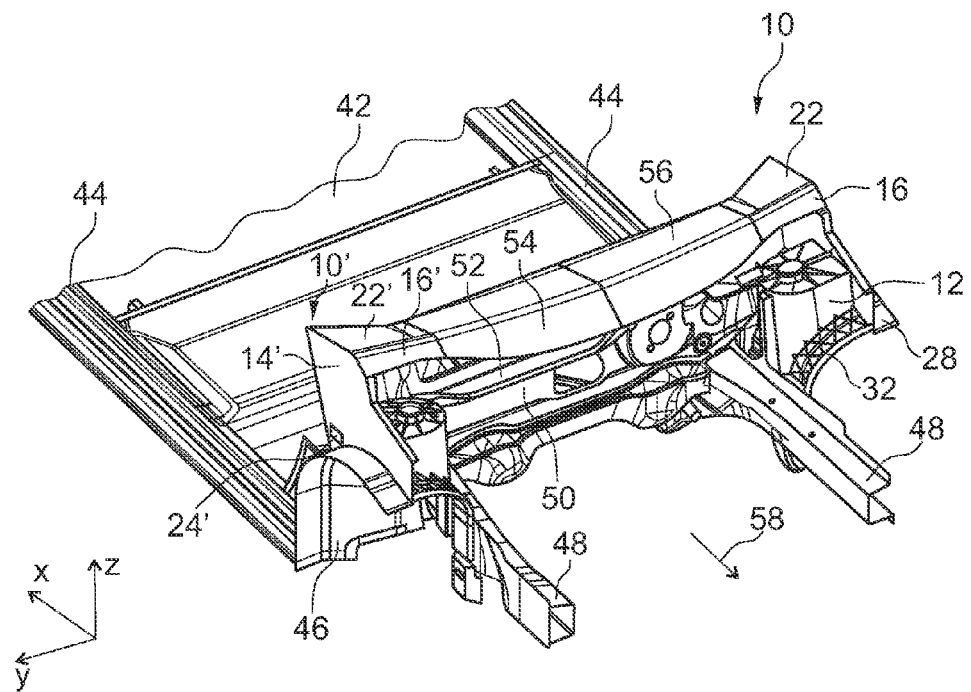
FIG. 4 is the motor vehicle body according to FIG. 3 with the load-bearing structural component secured thereto.

Toward the back, roughly facing away from the traveling direction 58 denoted in FIGS. 3 and 4, an upper end section of the wheel suspension strut 14 is adjoined by a windshield support 16 and adjacent thereto by a cover 22. The other end of the cover 22 here adjoins a bulkhead section 18 of the load-bearing structural component. As evident from FIGS. 1 and 2, the suspension strut holding fixture 12, the wheel suspension strut 14, the windshield support 16, the cover 22 along with the bulkhead section 18 make up a largely self-contained structure, wherein those of the end sections of the windshield support 16, cover 22 and bulkhead section 18 facing away from the wheel suspension strut 14 are configured for attachment to body components correspondingly designed thereto, e.g., as depicted on FIG. 3.

A drain channel 26 extending opposite the cover 22, i.e., in the region between the suspension strut holding fixture 12 and bulkhead section 18, adjoins the interior side of the wheel suspension strut 14 in relation to the transverse direction of the vehicle (y) as viewed toward the outside, and adjoins the bulkhead section 18 viewed in the longitudinal direction of the vehicle (x) and a rear side of the suspension strut holding fixture 12 facing away from the traveling direction 58. Provided in the region of the drain channel 26 is a drain 24 designed as an opening in the wheel suspension strut 14, by way of which the water accumulating in the drain channel 26 can pass through the wheel suspension strut 14 toward the outside.

A curved wheel well section 30 whose upper or interior side facing the engine compartment exhibits several reinforcing ribs 32 to provide structural reinforcement extends downward, adjoining the wheel suspension strut 14 and the pot-shaped suspension strut holding fixture 12. A closing plate 34 for a central engine bearer attachment extends downward, adjoining the wheel well section 30. The wheel well section 30 is here also integrated into the load-bearing structural component 10.

An outwardly protruding flange 28 adjusted to the shape of the wheel well section 46 is provided on the wheel suspension strut 14. The cast component 10 shown in isolation in FIGS. 1 and 2 is generally designed as a thin-walled cast steel component, and can be fabricated according to the principle of lost-foam casting, for example. Such a casting process makes it possible to provide back-cuts as well as nearly any geometric adjustment desired in terms of material strength and thickness, in particular with respect to potentially arising mechanical loads on the component.

The single-piece configuration, in particular the integration of the bulkhead section 18, windshield support 16, and cover 22 along with the drain channel 26 and wheel suspension strut 14 into the load-bearing structural component 10 advantageously makes it possible to shift the connecting sections of the load-bearing structural component 10 provided for attachment with adjoining body components, e.g., of the kind depicted on FIG. 3, closer toward the middle of the vehicle, wherein the individual joining sites are readily accessible during vehicle assembly.

The motor vehicle body 40 shown on FIG. 3 exhibits two side skirts 44 separated from each other in the transverse direction of the vehicle (y) and a floor panel 42 lying in between them. Two longitudinal members 48 extend toward the front, pointing in the traveling direction 58, whose rearward end section accommodates a respective wheel well section 46. At roughly the height of the wheel well or behind the latter, a bulkhead 50 extends between the longitudinal members 48, and its upper end section exhibits a cover 56 along with a central windshield support 54 provided hereon, which extends downward at an inclination viewed in the traveling direction. A drain channel 52 also to be designated as a radiator tank extends below the windshield support 54 or cover 56, and can be used to catch the water flowing down the windshield (not shown explicitly here) and laterally route it toward the wheel well sections 46.

As evident from FIG. 3, the bulkhead 50 extends only roughly as far as into the region of the longitudinal members 48 as viewed in the transverse direction of the vehicle (y). By contrast, the wheel well section 46 is not provided with a lateral end section of a bulkhead 50. Because a bulkhead section 18 is directly integrated into the load-bearing structural component 10 designed as a cast metal part, the bulkhead 50 will also only be completed after the load-bearing structural component 10 serving as the structural node has been installed. Much the same holds true for the cover 22 of the load-bearing structural component 10, which adjoins an edge of the cover 56 lying in the transverse direction of the vehicle (y), and can be joined with the body-side cover 56 spaced a certain distance apart from a wheel suspension strut 14.

The situation is also similar with respect to the alternating attachment of the central windshield support 54 and the windshield support 16 provided on the load-bearing structural component 10. Therefore, the bulkhead section 18 as shown in isolation on the load-bearing structural component in FIGS. 1 and 2 completes and rounds out a correspondingly formed cutout of the end of the body-side bulkhead 50 lying in the transverse direction of the vehicle (y).

The connecting sites or seams can be advantageously shifted from the bulkhead 18, 50, drain channel 26, 52 windshield support 16, 54 and upper cover 22, 56 toward the middle of the motor vehicle, so that no separate connection must be established in the actual node region where the body components extending in different directions adjoin each other, which might then also have to be separately sealed off as well.

In the final assembly configuration depicted on FIG. 4, the load-bearing structural component 10 shown in FIGS. 1 and 2 is designed as a left suspension strut holding fixture, and correspondingly mounted. A load-bearing structural component 10' designed symmetrically thereto can similarly be provided on a right end section of the bulkhead 50 or on a right longitudinal member 48.

As shown on FIG. 1, the bulkhead section 18 of the load-bearing structural component 10 is further provided with a passage 20, so that any connecting or supply lines, such as cables, can be run from the engine compartment into the vehicle interior. The load-bearing structural component 10 shown in isolation in FIGS. 1 and 2 can further be provided with additional fastening points and assembly aids, such as integrated holding fixtures or recesses, which make it easy to directly attach other components, for example hoses, supply tanks or a controller.

Since the load-bearing structural component comprised of cast metal must exhibit no material doubling whatsoever in the transitional region, roughly between the windshield support 16, cover 22, bulkhead section 18, drain channel 26, suspension strut holding fixture 12, wheel suspension strut 14 and/or wheel well section 30, e.g., for purposes of alternately fastening each component, both the component and weight can advantageously be reduced.

Omitting separate assembly processes also makes it possible to achieve lower production and assembly tolerances. In addition, the entire structural node region can be sealed better and more easily. No sealing operation need be performed at the end section of the drain channel 26 lying in the transverse direction of the vehicle (y), for example with respect to a bulkhead section 18, a suspension strut holding fixture 12 or a wheel suspension strut 14.

Finally, this also makes it possible to improve and simplify quality assurance, in particular with respect to sealing water-carrying components away from adjoining body components.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A load-bearing structural component of a motor vehicle body, comprising:
    a cast component that includes at least one suspension strut holding fixture and one bulkhead section, which are joined together as a single piece,
    wherein the load-bearing structure is designed as a cast steel component;
    a windshield support joined as a single piece with the suspension strut holding fixture; and
    a wheel suspension strut joined as a single piece with at least one of the suspension strut holding fixture, the bulkhead and the windshield support, wherein the suspension strut holding fixture, bulkhead section, windshield support and wheel suspension strut form an at least regionally closed, box-like structure.

2. The load-bearing structural component according to claim 1, wherein the windshield support is joined as a single piece with the bulkhead section.

3. The load-bearing structural component according to claim 1, further comprising:
    a wheel well section, which is joined as a single piece with at least one of the suspension strut holding fixture, the bulkhead section, the wheel suspension strut and the windshield support.

4. The load-bearing structural component according to claim 3, wherein an end section of a drain channel is arranged between the bulkhead section, suspension strut holding fixture and wheel suspension strut, and designed as a single piece with at least one of the bulkhead section, suspension strut holding fixture and wheel suspension strut.

5. The load-bearing structural component according to claim 4, wherein the windshield support transitions into the bulkhead section via a cover adjoining it.

6. The load-bearing structural component according to claim 5, wherein at least one of the windshield support, the cover and the bulkhead section extend substantially parallel to the surface normal of the adjoining wheel suspension strut.

7. A motor vehicle body, comprising:
    at least one longitudinal member;
    a bulkhead;
    at least one structural component designed as a cast steel component, the at least one structural component comprising:
        at least one suspension strut holding fixture, a bulkhead section and a windshield support that are joined together as a single piece,
    wherein, when the structural component is in its final assembly position, the bulkhead section forms a lateral elongation of the bulkhead;
    a central windshield support protruding in the longitudinal direction of the vehicle, wherein the central windshield support is provided at the upper end of the bulkhead, and
    wherein, in the final assembly position of the at least one structural component, the windshield support forms a lateral elongation of the central windshield support.

8. The motor vehicle body according to claim 7, wherein the at least one structural component includes:
    a wheel suspension strut, and wherein, in the final assembly position of the structural component, wherein the wheel suspension strut laterally borders a drain channel arranged upstream from the bulkhead in the traveling direction of the vehicle.

9. A motor vehicle, comprising:
    a motor vehicle body including at least one longitudinal member and a bulkhead;
    at least one structural component designed as a cast steel component, the at least one structural component comprising:
        at least one suspension strut holding fixture, a second bulkhead section, a wheel suspension strut and a windshield support that are joined together as a single piece; and
    a central windshield support protruding in the longitudinal direction of the vehicle, wherein the central windshield support is provided at the upper end of the bulkhead, and wherein, in the final assembly position of the at least one structural component, the windshield support forms a lateral elongation of the central windshield support.

10. A load-bearing structural component of a motor vehicle body, comprising:
- a cast component that includes at least one suspension strut holding fixture and one bulkhead section, which are joined together as a single piece wherein the load-bearing structural component is designed as a cast plastic part which at least regionally is provided with at least one metal inlay;
- a windshield support joined as a single piece with the suspension strut holding fixture; and
- a wheel suspension strut joined as a single piece with the suspension strut holding fixture, the bulkhead section and the windshield support,
- wherein the suspension strut holding fixture, the bulkhead section, the windshield support and the wheel suspension strut form an at least regionally closed, box-like structure.

* * * * *